US010626977B2

(12) United States Patent
Beque et al.

(10) Patent No.: US 10,626,977 B2
(45) Date of Patent: Apr. 21, 2020

(54) CORROSION INHIBITOR CONTAINER II

(71) Applicants: ZF FRIEDRICHSHAFEN AG, Friedrichshafen (DE); ZF WIND POWER ANTWERPEN N.V., Lommel (BE)

(72) Inventors: Rik Beque, Wingene (BE); Stijin Rottiers, Lokeren (BE); Andy Maes, Sinaa (BE); Koen Krieckemans, Noorderwijk (BE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 0 days.

(21) Appl. No.: 16/078,031

(22) PCT Filed: Jan. 26, 2017

(86) PCT No.: PCT/EP2017/051617
§ 371 (c)(1),
(2) Date: Aug. 21, 2018

(87) PCT Pub. No.: WO2017/144224
PCT Pub. Date: Aug. 31, 2017

(65) Prior Publication Data
US 2019/0048989 A1    Feb. 14, 2019

(30) Foreign Application Priority Data
Feb. 22, 2016   (DE) .................. 10 2016 202 665

(51) Int. Cl.
*F16H 57/031*   (2012.01)
*F03D 80/00*    (2016.01)
(Continued)

(52) U.S. Cl.
CPC .......... *F16H 57/031* (2013.01); *B65D 41/04* (2013.01); *F03D 80/00* (2016.05); *F16H 57/00* (2013.01);
(Continued)

(58) Field of Classification Search
CPC .... F16H 57/031; F16H 57/00; F16H 57/0402; F16H 57/0404; F16H 2057/0093;
(Continued)

(56) References Cited

U.S. PATENT DOCUMENTS 2,335,901 A    12/1943  Ayers, Jr.
2,407,023 A    9/1946   Lockwood
(Continued)

FOREIGN PATENT DOCUMENTS

CN    103541871 A    1/2014
DE    102013222845 A1   5/2015
(Continued)

*Primary Examiner* — David H Bollinger
(74) *Attorney, Agent, or Firm* — Leydig, Voit & Mayer LTD.

(57) ABSTRACT

A corrosion inhibitor container configured to be screwed into a core hole of a gearbox housing via at least one external thread includes at least one chamber for holding a corrosion inhibitor, at least one gas-permeable wall separating the at least one chamber from an interior of the gearbox housing when the corrosion inhibitor container is screwed into the core hole, the at least one external thread, at least one internal thread, and a screw plug configured to be screwed into the internal thread. The screw plug is configured to be screwed into the core hole when the corrosion inhibitor container is not screwed into the core hole.

16 Claims, 2 Drawing Sheets

(51) Int. Cl.
  *F16H 57/00*  (2012.01)
  *F16H 57/04*  (2010.01)
  *B65D 41/04*  (2006.01)
  *F16H 57/02*  (2012.01)

(52) U.S. Cl.
  CPC ..... *F16H 57/0402* (2013.01); *F16H 57/0404* (2013.01); *F05B 2260/95* (2013.01); *F16H 2057/0093* (2013.01); *F16H 2057/02078* (2013.01); *Y02E 10/722* (2013.01)

(58) Field of Classification Search
  CPC ........... F16H 2057/02078; F03D 80/00; F03D 15/00; B65D 41/04; B65D 81/264; B65D 81/18; B65D 81/26; F05B 2260/95; Y02E 10/722
  See application file for complete search history.

(56) References Cited

U.S. PATENT DOCUMENTS

| | | |
|---|---|---|
| 2,451,523 A | 10/1948 | Walb |
| 2,511,726 A | 6/1950 | Lockwood |
| 4,792,883 A | 12/1988 | Ackerman et al. |
| 10,059,502 B2 | 8/2018 | Huyberechts |
| 2016/0377169 A1 | 12/2016 | Van Eyndhoven |

FOREIGN PATENT DOCUMENTS

| | | |
|---|---|---|
| DE | 102013226526 A1 | 6/2015 |
| WO | WO 2012027954 A1 | 3/2012 |

CORROSION INHIBITOR CONTAINER II

CROSS REFERENCE TO RELATED APPLICATIONS

This application is a U.S. National Stage Application under 35 U.S.C. § 371 of International Application No. PCT/EP2017/051617 filed on Jan. 26, 2017, and claims benefit to German Patent Application No. DE 10 2016 202 665.8 filed on Feb. 22, 2016. The International Application was published in German on Aug. 31, 2017 as WO 2017/144224 A1 under PCT Article 21(2).

FIELD

The invention relates to a corrosion inhibitor container and to a method for assembling a wind turbine, the gearbox of which is provided with such a corrosion inhibitor container.

BACKGROUND

Documents U.S. Pat. Nos. 2,511,726 A, 2,407,023 A and 2,335,901 disclose corrosion inhibitor containers that can be screwed into a corresponding internal thread of a gearbox housing by means of an external thread. The corrosion inhibitor containers dispense a corrosion inhibitor into the interior of the gearbox housing. The formation of corrosion in the gearbox housing is thereby prevented.

If a gearbox is provided with a corrosion inhibitor container upon delivery, the corrosion inhibitor container must be removed before placement into service. The internal thread into which the corrosion inhibitor container was screwed must then be closed by means of a screw plug. In some cases, however, a suitable screw plug may not be available, for example due to negligence. As a result, the placement of the gearbox into service is delayed.

SUMMARY

In an embodiment, the present invention provides a corrosion inhibitor container being configured to be screwed into a core hole of a gearbox housing via at least one external thread. The corrosion inhibitor container includes at least one chamber for holding a corrosion inhibitor, at least one gas-permeable wall separating the at least one chamber from an interior of the gearbox housing when the corrosion inhibitor container is screwed into the core hole, the at least one external thread, at least one internal thread, and a screw plug configured to be screwed into the internal thread. The screw plug is configured to be screwed into the core hole when the corrosion inhibitor container is not screwed into the core hole.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
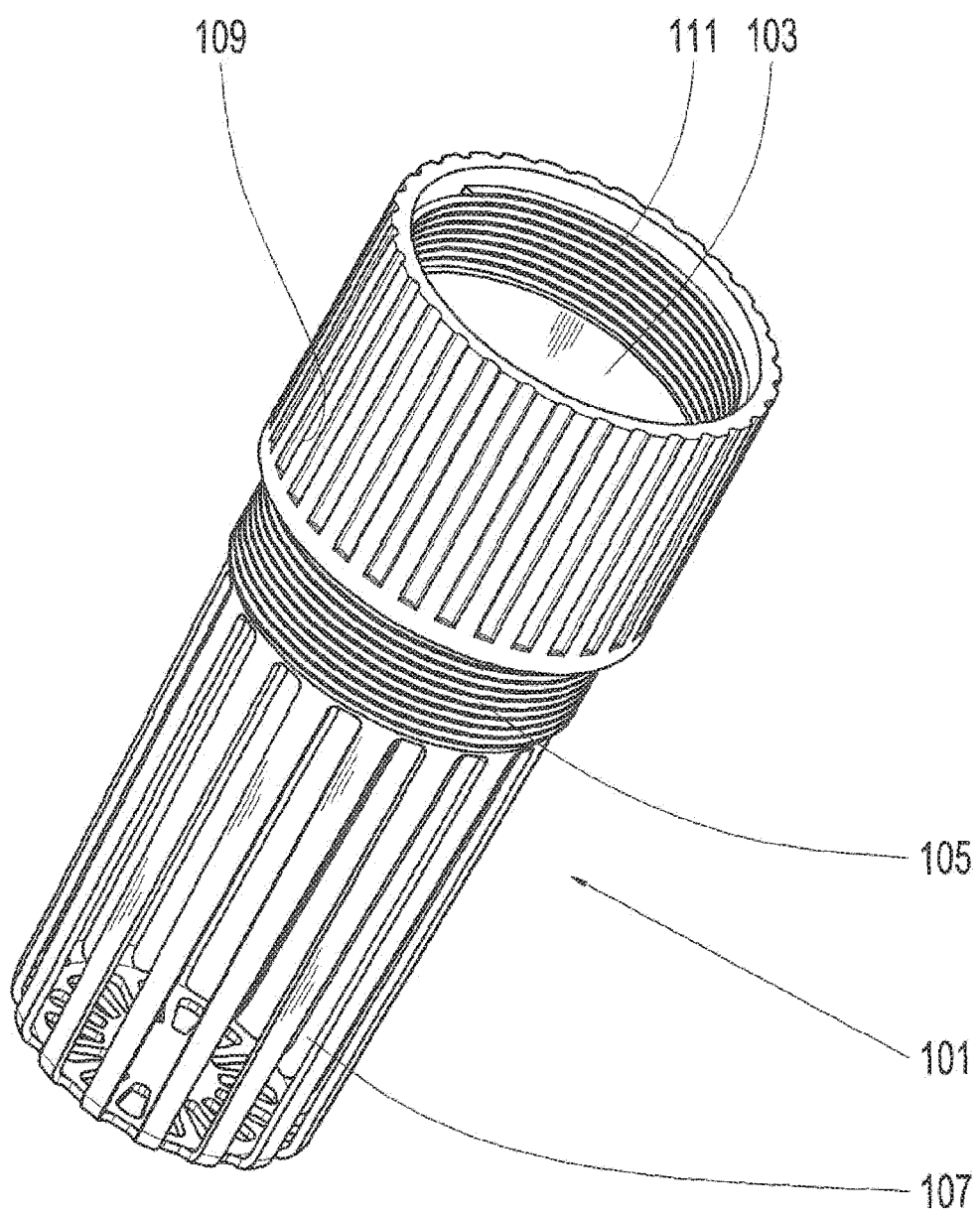
FIG. 1 shows an opened corrosion inhibitor container.

Embodiments of the invention provide corrosion inhibitor containers that do not have certain disadvantages inherent in the prior art. In particular, embodiments of the invention provide corrosion inhibitor containers via which the delays of the placement of the gearbox into service, as described above, can be avoided.

The corrosion inhibitor container, i.e. container for holding a corrosion inhibitor, has at least one chamber. The term "chamber" should be understood to mean a cavity at least partly enclosed by the corrosion inhibitor container.

The chamber serves to hold a corrosion inhibitor.

The term "corrosion inhibitor" refers to an agent that releases gases for corrosion protection, i.e. gases that have a corrosion-inhibiting effect, and/or a moisture-absorbing agent, such as silicate gel.

The corrosion inhibitor container also has at least one gas-permeable or pervious wall. In particular, the wall is permeable to the released corrosion-inhibiting gases and/or to moisture. The wall is preferably perforated, i.e. has a plurality of through-holes.

The corrosion inhibitor container is additionally provided with at least one external thread, by means of which the corrosion inhibitor container can be screwed into a core hole, i.e. into a bore having an internal thread, of a gearbox housing. The core hole is preferably a through-hole. The core hole is, for example, an oil-filling and draining opening or an inspection opening.

The corrosion inhibitor container is preferably screwed into the core hole from the outside. Thus, before being screwed in, the corrosion inhibitor container is outside of the gearbox housing or rather is in the environment of the gearbox housing. From there, when the corrosion inhibitor container is being screwed into the core hole, at least a part of the corrosion inhibitor container that comprises the wall is inserted through the core hole into an interior of the gearbox housing.

The interior of the gearbox housing is a cavity within the gearbox housing that is at least partly enclosed by the gearbox housing. The gearbox housing encapsulates the cavity from a region outside of the gearbox housing or rather from the environment of the gearbox housing.

The corrosion inhibitor container is designed in such a way that the wall is located in the interior of the gearbox housing and separates the chamber from the interior when the corrosion inhibitor container is screwed into the core hole. Because of the permeability of the wall, corrosion inhibitor or the released gases can pass from the chamber into the interior of the gearbox housing and/or moisture can pass from the interior into the chamber.

Corrosion inhibitor containers according to embodiments of the invention have at least one internal thread in addition to the external thread. A screw plug can be screwed into said internal thread. The same screw plug can be screwed into the core hole when the corrosion inhibitor container is not screwed into the core hole. This implies that the screw plug has an external thread that is the same as the external thread of the corrosion inhibitor container.

The internal thread of the corrosion inhibitor container allows the screw plug to be captively included in the delivery. If the corrosion inhibitor container is removed before the gearbox is placed into service, it is ensured that the screw plug is available and can be screwed into the core hole in place of the corrosion inhibitor container.

In a preferred further development, the screw plug serves to close the chamber. Thus, when the screw plug is screwed into the internal thread of the corrosion inhibitor container, the chamber is closed by the screw plug. This implies that the chamber is accessible through the internal thread when the screw plug is not screwed in. In particular, the chamber can then be filled with the corrosion inhibitor through the internal thread.

The corrosion inhibitor container also preferably has a rotationally symmetrical basic shape. This means that the corrosion inhibitor container is at least partially rotationally symmetrical. Thus, a part of the corrosion inhibitor container is rotationally symmetrical. The corrosion inhibitor container can also have parts, such as thread grooves or cut-outs, that are not rotationally symmetrical. The thread axes of the internal thread and of the external thread of the corrosion inhibitor container preferably correspond with an axis of symmetry of the rotationally symmetrical basic shape.

In an additionally preferred further development, the corrosion inhibitor container consists of a first part, a second part, and a third part. The first part comprises the wall, the second part comprises the external thread, and the third part comprises the internal thread. The second part is arranged between the first part and the third part. This implies that the first part is at least partially located in the interior of the gearbox housing, the second part is at least partially located in the core hole, and the third part is at least partially located outside of the gearbox housing or rather in the environment of the gearbox housing when the corrosion inhibitor container is screwed into the core hole of the gearbox housing by means of the external thread of the corrosion inhibitor container.

Preferably, the second part adjoins the first part and the third part, but the first part does not adjoin the third part.

In a preferred further development, the corrosion inhibitor container belongs to a wind power gearbox having a gearbox housing that has a core hole, into which the corrosion inhibitor container is screwed.

A screw plug is preferably screwed into the internal thread of the corrosion inhibitor container. Therefore, the screw plug can also be screwed into the core hole.

The corrosion inhibitor container described above enables methods according to embodiments of the invention for installing or assembling a wind turbine, having the following steps: installing the wind power gearbox described above into the wind turbine; removing the corrosion inhibitor container from the core hole by unscrewing the corrosion inhibitor container from the core hole; removing the screw plug from the internal thread by unscrewing the screw plug; and screwing the screw plug into the core hole after the corrosion inhibitor container has been removed from the core hole and the screw plug has been removed from the internal thread.

The method steps are preferably carried out in the indicated order. The method steps can also be carried out in any other order that is consistent with the wording of the description.

FIG. 1 shows an opened corrosion inhibitor container. The corrosion inhibitor container 101 according to FIG. 1 has an opening 103, through which a corrosion inhibitor can be introduced into the container 101.

By means of an external thread 105, the corrosion inhibitor container 101 can be screwed into a corresponding internal thread of a gearbox housing. A lower region of the corrosion inhibitor container 101 is then located in the interior of the gearbox housing. In this region, the corrosion inhibitor container 101 has openings 107, through which corrosion inhibitor can escape in gas form into the interior of the gearbox.

In the upper region of the corrosion inhibitor container, the corrosion inhibitor container 101 is provided with fluting 109. Said fluting makes it easier to screw the corrosion inhibitor container 101 into the gearbox housing.

Furthermore, the corrosion inhibitor container 101 has an internal thread 111 in the upper region of the corrosion inhibitor container. Said internal thread protrudes from the gearbox housing when the corrosion inhibitor container is screwed into the gearbox housing. In particular, the internal thread remains accessible.

Figure 2:
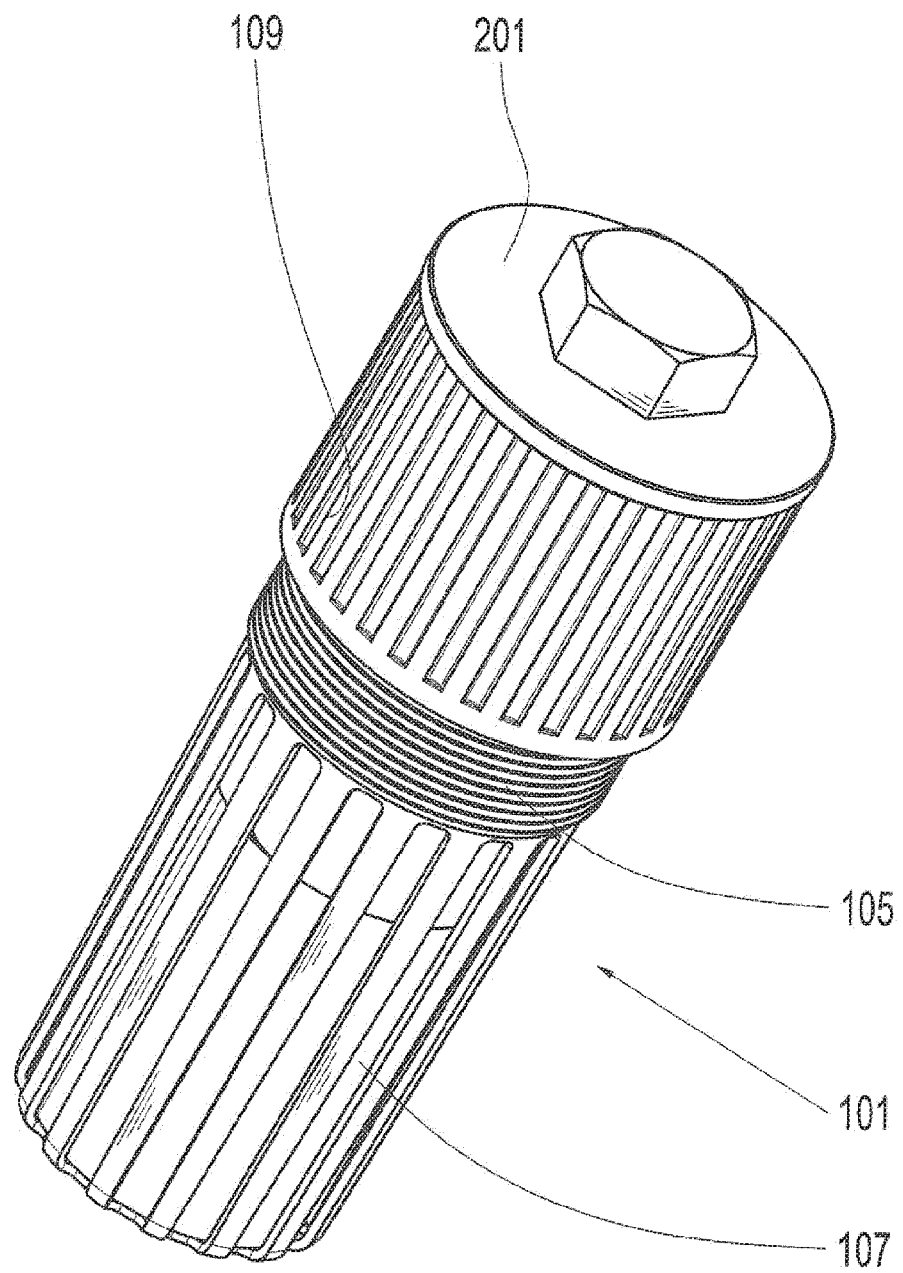
FIG. 2 shows a corrosion inhibitor container with a screw plug.

FIG. 2 shows a corrosion inhibitor container with a screw plug. As shown in FIG. 2, the internal thread 111 serves to receive a screw plug 201. The corrosion inhibitor container 101 is initially screwed into the gearbox housing when the gearbox is delivered. The screw plug 201 is located in the internal thread 111 of the corrosion inhibitor container 101.

The corrosion inhibitor container 101 is removed in order to place the gearbox into service. In order to close the arising opening in the gearbox housing, the screw plug 201 is removed from the corrosion inhibitor container 101 and screwed into the gearbox housing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 101 corrosion inhibitor container
103 opening
105 external thread
107 opening
109 fluting
111 internal thread
201 screw plug

The invention claimed is:

1. A corrosion inhibitor container being configured to be screwed into a core hole of a gearbox housing via at least one external thread, comprising:
   at least one chamber for holding a corrosion inhibitor;
   at least one gas-permeable wall separating the at least one chamber from an interior of the gearbox housing when the corrosion inhibitor container is screwed into the core hole;
   the at least one external thread;
   at least one internal thread; and
   a screw plug configured to be screwed into the internal thread,
   wherein the screw plug is configured to be screwed into the core hole when the corrosion inhibitor container is not screwed into the core hole.

2. The corrosion inhibitor container according to claim 1, wherein the at least one chamber is accessible through the at least one internal thread.

3. The corrosion inhibitor container according to claim 1, wherein the corrosion inhibitor container has a rotationally symmetrical basic shape.

4. The corrosion inhibitor container according to claim 1, wherein the corrosion inhibitor container consists of a first part, a second part, and a third part, the first part comprising the at least one gas permeable wall, the second part comprising the at least one external thread, and the third part comprising the at least one internal thread, and wherein the second part is arranged between the first part and the third part.

5. The corrosion inhibitor container according to claim 4, wherein the second part adjoins the first part and the third part.

6. A wind power gearbox, comprising:
   a gearbox housing having a corrosion inhibitor container according to claim 1, and a core hole,
   wherein the corrosion inhibitor container is configured to be screwed into the core hole.

7. The wind power gearbox according to claim 6, wherein a screw plug is screwed into the internal thread of the corrosion inhibitor container.

8. A method for assembling a wind turbine, the method comprising:
   installing a wind power gearbox according to claim 7;
   removing the corrosion inhibitor container from the core hole;
   removing the screw plug from the internal thread; and
   screwing the screw plug into the core hole.

9. A corrosion inhibitor container, comprising:
   a first external thread configured to be screwed into a core hole of a gearbox housing;
   a chamber for holding a corrosion inhibitor;
   a gas-permeable wall separating the at least one chamber from an interior of the gearbox housing when the first external thread is screwed into the core hole;
   an internal thread; and
   a screw plug having a second external thread, the second external thread being configured to be screwed into the internal thread and configured to be screwed into the core hole of the gearbox housing when the first external thread is not screwed into the core hole.

10. The corrosion inhibitor container according to claim 9, wherein the first external thread has a first pitch, and wherein the internal thread has a pitch equal to that of the first pitch.

11. The corrosion inhibitor container according to claim 10, wherein the second external thread has a pitch equal to that of the first pitch.

12. The corrosion inhibitor container according to claim 9, wherein the first external thread and the second external thread have the same diameter, thread angle, and pitch.

13. The corrosion inhibitor container according to claim 12, wherein the internal thread has a diameter corresponding to that of the first and second external threads.

14. The corrosion inhibitor container according to claim 9, wherein the gas-permeable wall extends, from the first external thread, in a first direction, the corrosion inhibitor container further comprising a fluted wall that extends, from the first external thread, in a second direction opposite the first direction.

15. The corrosion inhibitor container according to claim 14, wherein the fluted wall is cylindrical and surrounds the internal thread.

16. The corrosion inhibitor container according to claim 15, wherein the fluted wall has a fluting radius measured from a base of a flute to an axis of rotation of the corrosion inhibitor container, wherein the screw plug includes a base portion disposed in the second direction from the fluted region, and wherein the base portion of the screw plug has a radius that is greater than the fluting radius.

* * * * *